United States Patent [19]

Avi-Itzhak

[11] Patent Number: 5,530,775
[45] Date of Patent: Jun. 25, 1996

[54] METHOD OF MULTI-FONT TEMPLATE ENHANCEMENT BY PIXEL WEIGHTING

[75] Inventor: Hadar Avi-Itzhak, Mountain View, Calif.

[73] Assignee: Canon Inc., Tokyo, Japan

[21] Appl. No.: 293,161

[22] Filed: Aug. 19, 1994

Related U.S. Application Data

[63] Continuation-in-part of Ser. No. 8,556, Jan. 22, 1993, abandoned.

[51] Int. Cl.$^6$ .................................................... G06K 9/62
[52] U.S. Cl. ......................... 382/209; 382/159; 382/161
[58] Field of Search .................................... 382/155, 159, 382/161, 209, 218, 224, 227

[56] References Cited

U.S. PATENT DOCUMENTS

| | | | |
|---|---|---|---|
| 5,204,914 | 4/1993 | Mason et al. | 382/30 |
| 5,379,349 | 1/1995 | Avi-Itzhak | 382/215 |

*Primary Examiner*—Leo Boudreau
*Assistant Examiner*—Phuoc Tran
*Attorney, Agent, or Firm*—Paul Hentzel

[57] ABSTRACT

A library of L unenhanced images (pixel bit maps) is enhanced for optical character recognition (OCR) with respect to a pre-existing group of G input symbol classes for creating a library of G recognition enhanced templates (pixel bit maps) of the G input symbol classes. The enhancement is accomplished by comparing each image of the library with each pixel version of each symbol class (forming V sets of L comparisons), and weighting the images with the highest potential for confusion. Divergent pixel version are further divided into sub-classes, each with a sub-image which evolves into a sub-template. A primary comparison C* and a secondary comparison C** are identified from the L comparisons within each of the V sets of comparisons. A recognition margin is determined between each pair of identified comparisons C* and C**. The single pair of identified comparisons C* and C** is selected forming the smallest recognition margin M*. The single pair of images $I_j^*$ and $I_j^{**}$ underlying the pair of identified comparisons C* and C** is identified. Certain pixels of the closest pixel image $I_j^*$ and the next closest pixel image $I_j^{**}$ are weighted in order to increase the recognition margin M* therebetween. The steps are iterated until the library of pixel images (and sub-images) has become a library of enhanced symbol templates (and sub-templates). The weighted pixel aberrations generated in the enhanced templates (and sub-templates) are not present in the corresponding symbol of the pre-existing group of G input symbol classes (and sub-classes).

31 Claims, 7 Drawing Sheets

VxL
(General Case)
Comparison
Matrix

| | $I_L$ | ... | $I_j$ | ... | $I_2$ | $I_1$ |
|---|---|---|---|---|---|---|
| | $C_{11L}\ C_{12L}\ C_{13L}$ | | $C_{11j}\ C_{12j}\ C_{13j}$ | | | |
| | | | | | $C_{21j}\ C_{22j}\ C_{23j}$ | |
| | | | | | $T_{212}\ T_{222}\ T_{232}$ | |
| | | | | ... | | |
| | $C_{i1L}\ C_{i2L}\ C_{i3L}$ | | $T_{1ij}\ T_{i2j}\ T_{i3j}$ | | | |
| | | | | | $C_{i12}\ C_{i22}\ C_{i32}$ | $C_{i11}\ C_{i21}\ C_{i31}$ |
| | | | ... | | | |
| | $T_{G1L}\ T_{G2L}\ T_{G3L}$ | | $C_{G1j}\ C_{G2j}\ C_{G3j}$ | | | $C_{G11}\ C_{G21}\ C_{G31}$ |
| | | | | | | $T_{111}\ T_{121}\ T_{131}$ |

| $s_{i1}\ s_{i2}\ s_{i3}$ | $s_{i1}\ s_{i2}\ s_{i3}$ | $s_{G1}\ s_{G2}\ s_{G3}$ |
|---|---|---|
| $S_1$ | $S_i$ | $S_G$ |

←— V Pixel Versions in G Symbol Classes —→

←— Group of G Symbol Classes —→

Library of L Initial Images

"oce" Cluster Comparison Matrix

METHOD OF MULTI-FONT TEMPLATE ENHANCEMENT BY PIXEL WEIGHTING

This application is a continuation-in-part of application Ser. No. 08/008,556, filed Jan. 22 1993, now abandoned.

TECHNICAL FIELD

This invention relates to optical character recognition of classes of input symbols, and more particularly to the enhancement of pixel templates in response to multiple pixel versions within the symbol classes.

BACKGROUND

Heretofore, correlation coefficients have been employed to identify incoming pixel images such as radar return signals and character bit maps. The input pixel images were compared to-library template images on a pixel by pixel basis. The summation of all of the pixel comparisons in each image/template match produced a correlation coefficient indicating the closest match. However, these prior correlation techniques did not involve any change or enhancement of the pixels forming the library templates. U.S. Pat. No. 5,379,349, issued Jan. 3, 1995 to Hadar Avi-Itzhak (Ser. No. 07/937,732, filed Sep. 1, 1992 by the present assignee) entitled METHOD OF OCR TEMPLATE ENHANCEMENT BY PIXEL WEIGHTING; shows enhancement of library templates without provision for sub-classes of font versions.

SUMMARY

It is therefore an object of this invention to provide a template enhancement method for improving the recognition of classes of optical symbols having multiple versions within each class.

It is another object of this invention to provide such a template enhancement method which maximizes the minimum margin defined by a primary comparison C* (between an input pixel version of a symbol class and the corresponding pixel template) and a maximum secondary comparison C** (between the input pixel version and the next closest template).

It is another object of this invention to provide such a template enhancement method which employs sub-classes of divergent pixel versions within the same symbol class, and provides sub-templates for each sub-class of pixel versions.

It is another object of this invention to provide such a template enhancement method in which the pixel versions within each sub-class are not compared to the sub-templates corresponding to other sub-classes within the same symbol class.

It is another object of this invention to provide such a template enhancement method which minimizes the number of templates in the library of templates for symbol classes having multiple versions therein.

Briefly, these and other objects of the present invention are accomplished by providing a method of recognition enhancement of a library of L unenhanced pixel templates or images ($I_1$ $I_2$ $I_3$ ... $I_j$ ... $I_L$) with respect to a pre-existing group of G classes of symbols ($S_1$ $S_2$ $S_3$ ... $S_i$ ... SG). At least some of the symbol classes include multiple pixel versions of the same symbol. There are a total of V pixel versions in all of the G symbol classes. The method provides a library of G recognition enhanced pixel templates ($T_1$ $T_2$ $T_3$ ... $T_i$ ... $T_G$) one enhanced template corresponding to each of the G symbol classes. Each of the V pixel versions is compared with each of the L pixel images (unenhanced templates) to obtain V×L comparisons forming V sets of L comparisons ($C_1$ $C_2$ $C_3$ ... $C_j$ ... $C_L$). One set of L comparisons is formed for each of the V pixel versions. Each set of comparisons having a comparison $C_j$ for each image (unenhanced template) $I_j$ of the L images. A primary comparison $C_i$* is identified from the L comparisons within each of the V sets of comparisons having the closest comparison with the pixel version $s_i$ for that set of comparisons. A secondary comparison $C_i$** is identified from the L-1 remaining comparisons within each of the V sets of comparisons having the next closest comparison with the pixel version $s_i$ for that set of comparisons. A collection of V pairs of identified comparisons $C_i$* and $C_i$** are formed, one pair from each of the V sets of comparisons. V recognition margins ($M_1$ $M_2$ $M_3$ ... $M_i$ ... $M_V$) are determined, one recognition margin between each pair of identified comparisons $C_i$* and $C_i$**. The single pair of identified comparisons $C_i$* and $C_i$** is selected which forms the smallest recognition margin $M_i$* of all of the V pairs of identified comparisons from the V sets of comparisons. The single pair of pixel images $I_j$* and $I_j$** is identified which corresponds to the pair of identified comparisons $C_i$* and $C_i$**. Certain pixels of either the closest pixel images $I_j$* or the next closest pixel image $I_j$** or both are weighted. The images being weighted (unenhanced templates) correspond to the selected single pair of identified comparisons $C_i$* and $C_i$** in order to increase the recognition margin $M_i$* therebetween. The comparing, identifying, determining, selecting, and weighting steps are iterated until the library of pixel images (unenhanced templates) has become a library of enhanced symbol templates ($T_1$ $T_2$ $T_3$ ... $T_i$ ... $T_G$) at least some of which have weighted pixel aberrations not present in the corresponding pixel versions within each of the pre-existing group of corresponding G symbol classes ($S_1$ $S_2$ $S_3$ ... $S_i$ ... $S_G$).

BRIEF DESCRIPTION OF THE DRAWING

Further objects and advantages of the template enhancement technique will become apparent from the following detailed description and drawings in which.

Figure 1A:
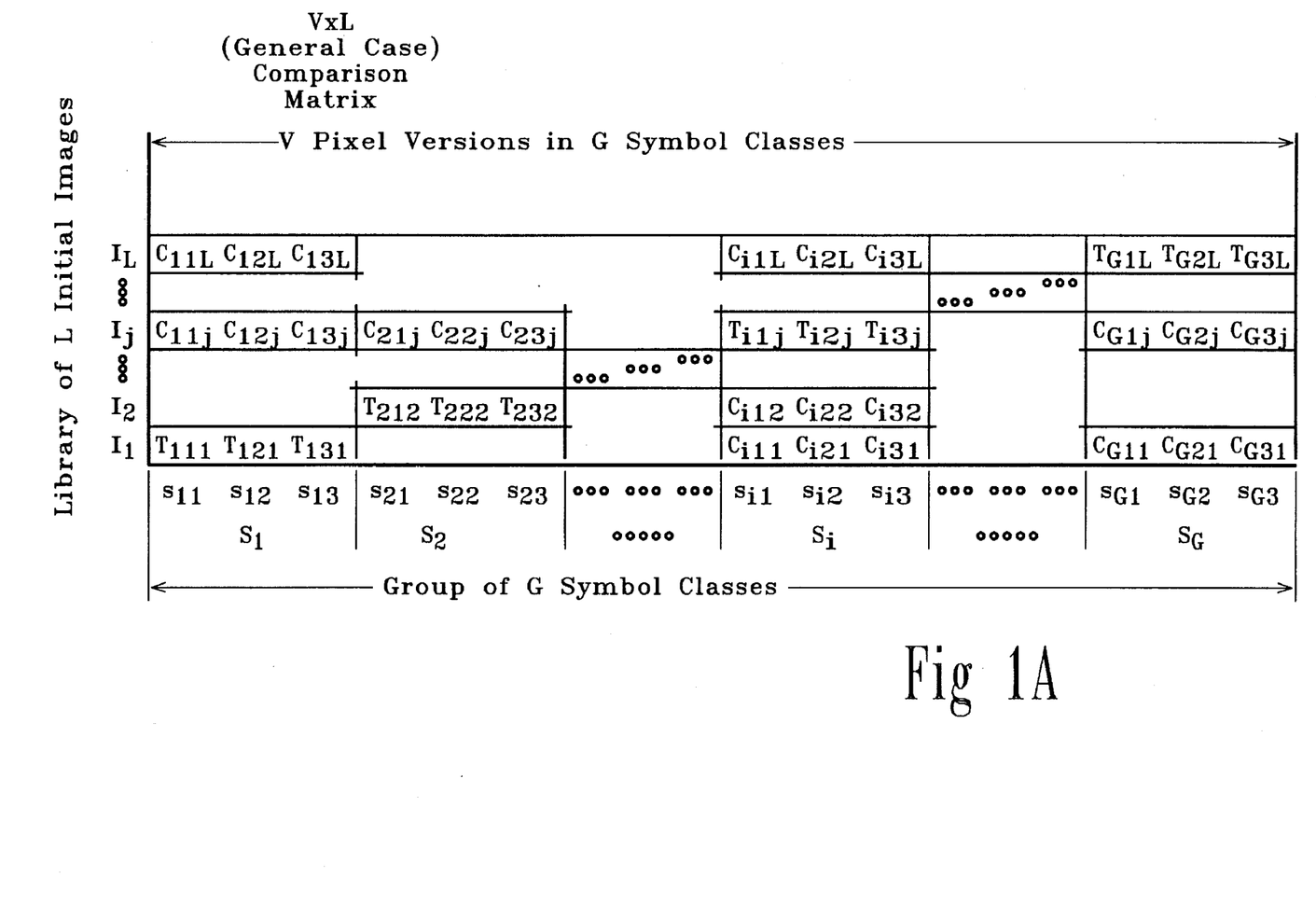
FIG. 1A is a comparison matrix (general case) showing V×L comparisons between pixel versions within a group of G symbol classes and a library of L images (unenhanced templates)
Figure 1B:
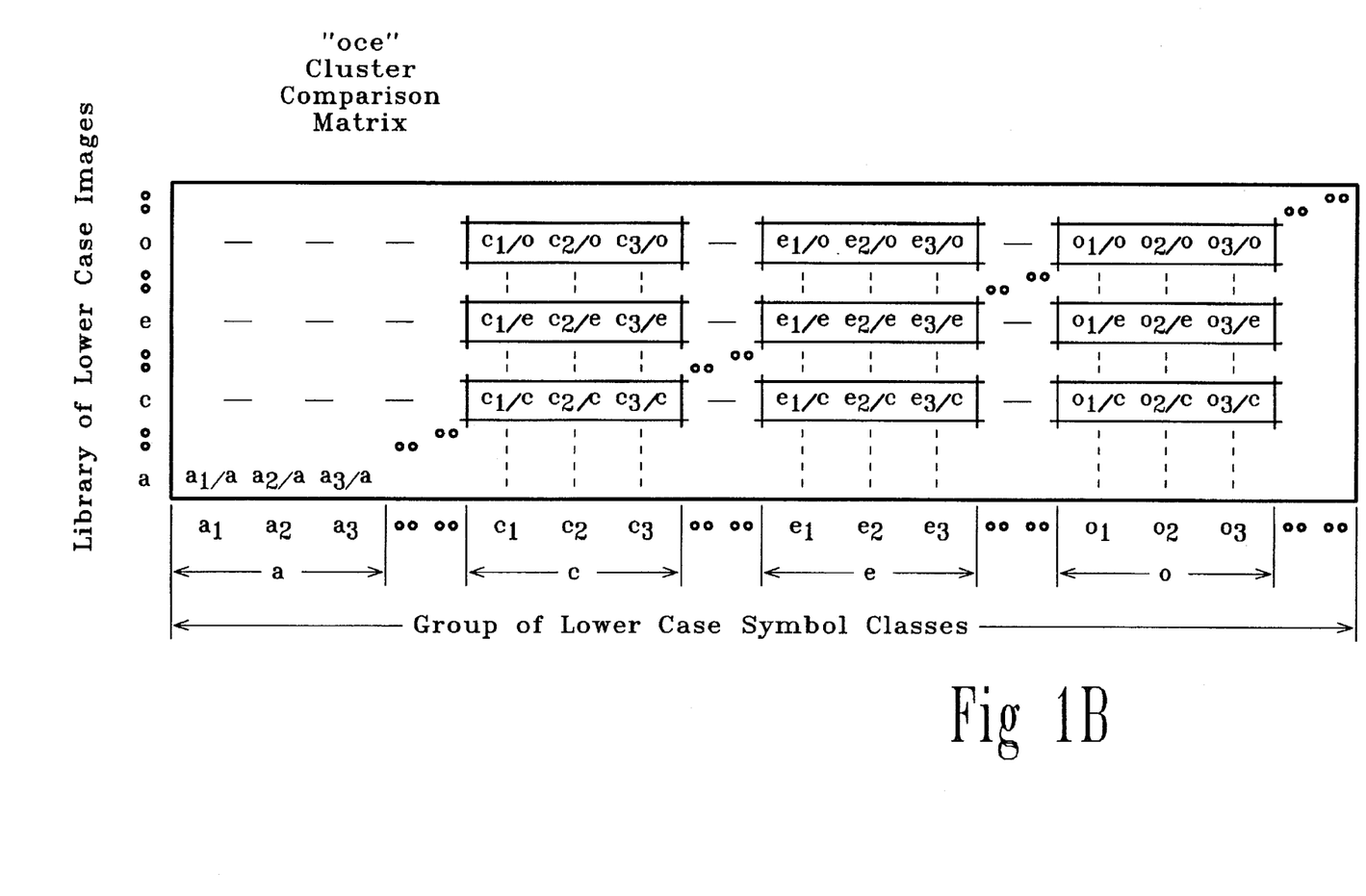
FIG. 1B is a V×L comparison matrix between the lower-case pixel versions of the letters a–z and a library of lower-case images (unenhanced templates) illustrating the "oce" cluster of anti-characters.
Figure 2:
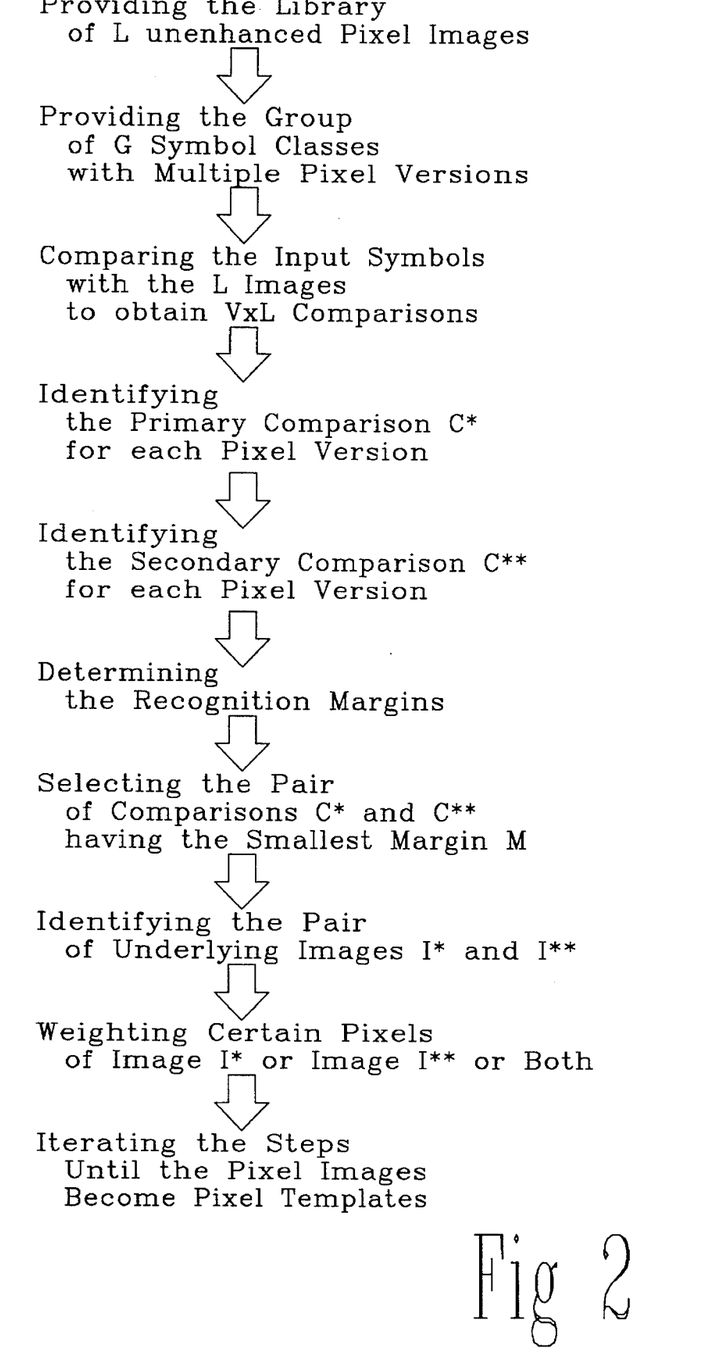
FIG. 2 is a flow chart showing the steps in the method of template enhancement.

GENERAL METHOD OF ENHANCEMENT—(FIGS. 1A 1B and 2)

A library of L unenhanced images or templates (pixel bit maps) is enhanced for optical character recognition (OCR) with respect to a pre-existing group of G input symbol classes. The enhancement creates a library of G recognition enhanced templates (pixel bit maps) of the G input symbols, one enhanced template corresponding to each symbol class. Some of the Symbol classes include multiple pixel versions of the same symbol, resulting in a total number of pixel versions "V". The enhancement is accomplished by comparing each unenhanced template of the library with each input pixel version of each symbol class (forming V×L comparisons), and weighting the unenhanced templates having the highest potential for confusion. The library of L unenhanced initial templates extends along the vertical axis of the V×L comparison matrix of FIG. 1A (shown as images $I_1 I_2 \ldots I_j \ldots I_L$). The pre-existing group of G symbol classes extends along the horizontal axis of the V×L matrix (shown as general symbol classes $S_1 S_2 \ldots S_i \ldots S_G$). The "V" input pixel versions are shown in association with each symbol class. In the embodiment of FIG. 1A, the input pixel versions are illustrated by three general alpha-numeric fonts extending along the horizontal axis beginning with the symbol class "$S_1$" and the three pixel versions "$s_{11}$", "$s_{12}$", and "$s_{13}$". The library of G recognition enhanced templates ($T_1 T_2 T_3 \ldots T_i \ldots T_G$) is not represented in the V×L matrix. However, the three sets of version/image comparisons for the library of G recognition enhanced templates extend along the diagonal of the V×L matrix (shown as template comparisons $T_{111} T_{121} T_{131}, T_{212} T_{222} T_{232} \ldots T_{i1j} T_{i2j} T_{i3j} \ldots T_{G1L} T_{G2L} T_{G3L}$). The input pixel versions correspond to the unenhanced initial templates or images of the G recognition enhanced templates. This diagonal template relationship assumes that the symbol classes and images are presented along each axis in the same order, that is $S_j=I_j$, and $S_{i+1}=I_{j+1}$. A comparison matrix for lower-case symbol classes a–z also three fonts) is shown in FIG. 1B, specifically illustrating the version/image comparisons for the cluster of look-alike characters "o", "c", and "e".

The steps of the template enhancement method are summarized in FIG. 2, and described in detail below.

Providing the library of L unenhanced pixel templates or images ($I_1 I_2 I_3 \ldots I_j \ldots I_L$) which will evolve into the distinctive library of G enhanced templates.

Providing the group of G symbol classes ($S_1 S_2 S_3 \ldots S_i \ldots S_G$) with multiple pixel versions of the specific user design fonts of interest. Common design fonts for alpha-numeric applications are Courier and Times Roman. Typically, user fonts include

| | |
|---|---|
| upper-case | ABCDEFGHIJKLMNOPQRSTUVWXYZ |
| lower-case | abcdefghijklmnopqrstuvwxyz |
| numbers | 1234567890 and |
| punctuation | !@#$%^&*()_+-=[]{};'":"=\|,<.>/?. |

However, the present template enhancement technique is general method, and may be implemented on other graphical symbols. For convenience, three font versions are shown in FIG. 1A for the group; of G symbol classes. The present enhancement techniques may be applied to two font versions, or four or more. Different symbol classes may have a different number of font versions. In general each symbol class may have "n" font versions ($s_1 s_2 s_3 \ldots s_n$) where "n" is not necessarily the same integer for each symbol class.

The present enhancement technique may be applied to either design font variations or implementation variations (see section Sub-Classes - Sub-Templates). The enhancement technique is applicable to many other recognition applications involving classes with multiple input versions; such as radar return signals, and audio recognition applications involving phoneme sound patterns (speech fonts).

The font of the unenhanced initial templates maybe similar to the input version fonts for maximizing the initial version/image comparison, and for providing a convenient starting place for the template evolution. Alternatively, the initial unenhanced template font may be a general font or special precursor font of the input version fonts; or even a template based on random noise. The number of unenhanced templates or images L in the library may be equal to or greater than the number of symbol classes G in the group. The library may have image entries which are not included among the symbol classes. These "idle" images are not involved in the version/image comparisons, and therefore do not change and become templates. Preferably, L is not be less than G, to avoid a single image attempting to evolve in response to the input versions of two separate symbol classes.

Comparing each of the V input pixel versions with each of the L unenhanced initial templates to obtain V×L comparisons as shown in the body of the V×L matrix of FIG. 1. The version/image comparisons are accomplished by comparing each pixel of general unenhanced template $I_j$ with each pixel of an input version $s_i$ of general symbol class $S_i$ based on a comparison function (discussed in more detail later Cauchy-Shwartz section). The V×L comparisons form V sets of L comparisons with one set of L comparisons for each input pixel version. Each set of L comparisons includes a comparison $C_{ij}$ for each unenhanced template $I_j$. The set of comparisons for three font versions sil, $s_{i1}$, $s_{i2}$, and $s_{i3}$ of general symbol class $S_i$ extends upwards in the three adjacent columns above $S_i$. The first column is for the font version "$s_{i1}$" (shown as $C_{i11} C_{i12} \ldots T_{i1j} \ldots C_{i1L}$). The second column is for the version "$s_{i2}$" (shown as $C_{i21} C_{i22} \ldots T_{i2j} \ldots C_{i2L}$), the third column is for "$s_{i3}$" (shown as $C_{i31} C_{i32} \ldots T_{i3j} \ldots C_{i3L}$). The column set of initial L comparisons for the input pixel version "$o_2$" (lower-case) of the "o" symbol class, relative to an alpha-numeric image font, is displayed in the bar graph of FIG. 3A.

Identifying the primary comparison C* from the L comparisons within each of the V sets of comparisons having the closest comparison with the input pixel version for that set. A total of V primary comparisons C* are identified forming a primary collection ($C_1^* C_2^* C_3^* \ldots C_i^* \ldots C_v^*$) across the columns The highest comparison C* for the input font version "$o_2$" (lower-case) is of course the unenhanced template "$o_2$" (lower-case) The highest comparison C* for the "$o_1$" and "$o_3$" font versions of the "o" symbol class is with the unenhanced image "o". A single unenhanced image (and enhanced template) is available for each class of pixel versions.

Figure 3A:
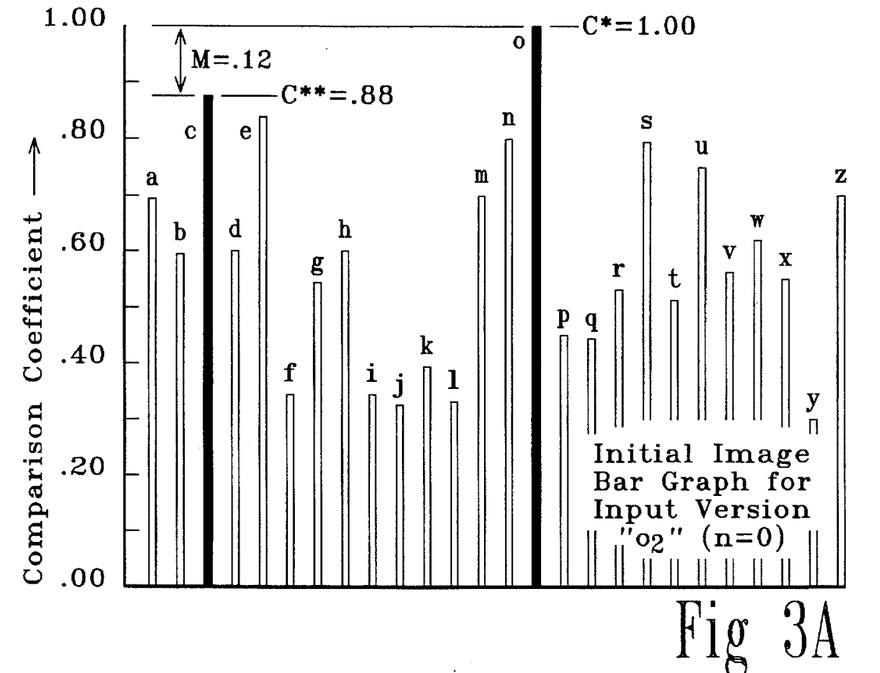
FIG. 3A is a bar graph of the set of initial image comparison coefficients between the single lower-case input version "$o_2$" and the lower-case letters a–z of FIG. 1B.

Identifying the secondary comparison C from the L-1 remaining comparisons within each of the V sets of comparisons having the next closest comparison with the input pixel version. The unenhanced template underlying the secondary comparison C is the most likely unenhanced template to be confused with the input pixel version. A total of V secondary comparisons C are identified forming a secondary collection ($C_1^{}$ $C_2^{}$ $C_3^{}$ ... $C_i^{}$ ... $C_V^{}$) across the columns The primary and secondary collections form V pairs of identified comparisons C* and C, one pair from each of the V column sets of comparisons. The next highest comparison C for the input version "$o_2$" in FIG. 3A is the $o_2$/c secondary comparison for the unenhanced template "c" (lower-case). The symbol classes "o" and "c" and "e" form a cluster of similarly shaped images and templates which have a high potential for confusion and become "anti-characters" (see next section on anti-character and clusters).

Determining V recognition margins ($M_1$ $M_2$ $M_3$ ... $M_i$ ... $M_V$), one recognition margin between each pair of identified primary and secondary comparisons C* and C**. A total of V recognition margins M are determined. The size of the margin M is the difference between the value of C* and the value of C**. The initial $o_2$/c margin is 0.12, for the data and embodiment shown in FIG. 3A.

Selecting the single pair of identified comparisons C* and C** forming the smallest recognition margin M* of all of the V pairs of identified comparisons. The smaller the recognition margin, the greater is the danger of OCR confusion between the input pixel version and the unenhanced images.

Identifying the single pair of images I* and I** underlying the pair of identified comparisons C* and C**. The image I* is the unenhanced template match for the input pixel version and image I** is the most probable source of confusion with this pixel version.

Weighting certain pixels of either the closest pixel image I* or the next closest pixel image I** or both, which underlie the selected pair of identified comparisons C* and C**. The weighting is directed toward increasing the recognition margin M* therebetween causing the pixel images to become the closest enhanced pixel template T* or the next closest enhanced pixel template T** or both.

Iterating the comparing, identifying, determining, selecting, and weighting steps until the library of unenhanced pixel images has become a library of sufficiently enhanced symbol templates ($T_1$ $T_2$ $T_3$ ... $T_i$ ... $T_G$). The weighted pixel aberrations generated in the enhanced templates are not present in the corresponding pixel versions of the pre-existing group of G symbol classes ($S_1$ $S_2$ $S_3$ ... $S_i$ ... $S_G$).

Matching a pixel version of an unknown input symbol of the group of G symbol classes ($S_1$ $S_2$ $S_3$ ... $S_i$ ... $S_G$) with the library of enhanced templates ($T_1$ $T_2$ $T_3$ ... $T_i$ ... $T_G$) by comparing the pixel version with each of the enhanced pixel templates in the library of enhanced templates and selecting the enhanced template with the closest comparison.

TERMINATION

The enhancement weighting process is terminated when the smallest recognition margin generated between the input pixel versions and the templates is greater than a predetermined "safe" minimum value. That is, when even the most error prone version/template comparison has a sufficiently high probability of being correct. The process may also be terminated when the incremental increase in the smallest margin is smaller than a predetermined minimum increase. That is, when the rate of change of the recognition margin of the templates each iteration is negligible and does not merit the time required. Alternatively, the process may be stopped after a specified number of weighting iterations have been executed; or preassigned period of processing time has elapsed. The enhancement of the templates may be occasionally slowed by the formation of a "local maxima" in the margin contour between the primary comparison and the secondary comparison. If the local maxima is an unstable one, it releases during subsequent iterations; and the enhancement process returns to the prior unhindered speed. However, if the local maxima is stable, the enhancement process becomes permanently locked between the primary and secondary comparison. The recognition margin remains fixed at the same level with (approximately) zero change.

Figure 4A:
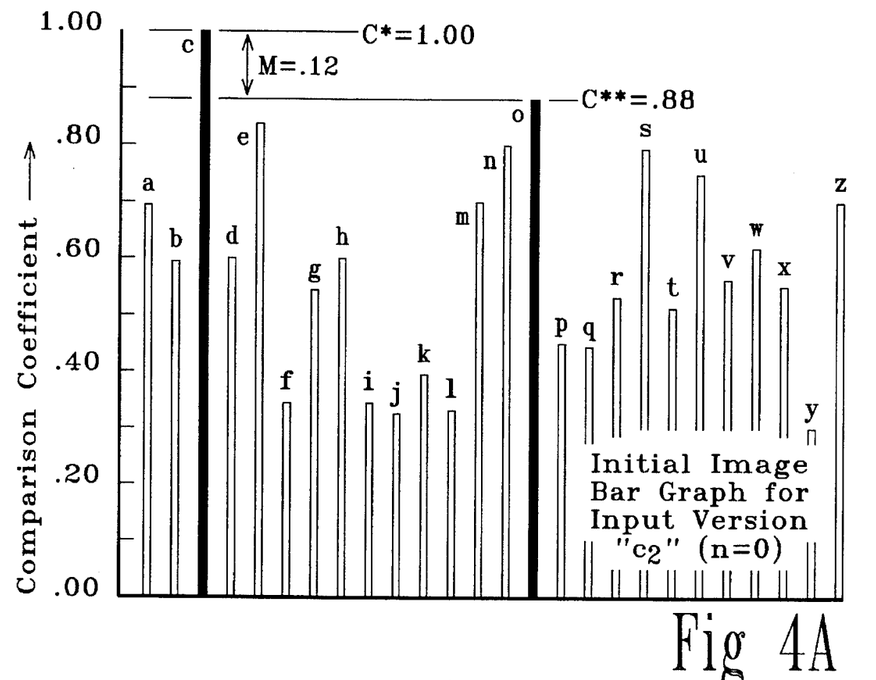
FIGS. 4A and 4B are bar graphs for the lower-case input version "$c_2$" similar to FIGS. 3A and 3B.
Figure 5A:
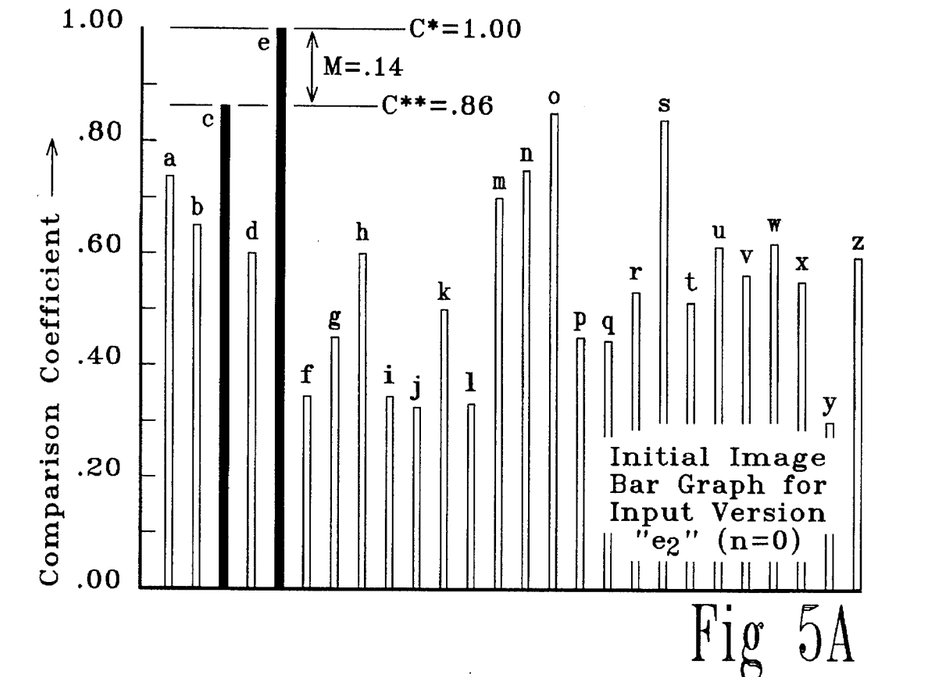
FIGS. 5A and 5B are bar graphs for the lower-case input version "$e_2$" similar to FIGS. 3A and 3B.

ANTI-CHARACTER—(FIGS. 3A 4A 5A)

The symbol classes "o" and "c" and "e" form a cluster of similarly shaped unenhanced images having a high potential for confusion. The characters of the cluster become mutual "anti-characters", when they come into contrast with one another during the enhancement process. That is, when one member of the cluster forms primary comparison C*, and another member of the same cluster forms secondary comparison C**. Initially only the "o" image and the "c" image are anti-characters (shown in bold in the "$o_2$" bar graph of FIG. 3A). The cluster of anti-characters for the unenhanced "o" template then expands to include the "censu" anti-characters (shown in bold in the "$o_2$" bar graph of FIG. 3B). Other clusters of lower-case look-alike anti-characters are formed by "f" and "t", and by "h" and "b". An example of a punctuation look-alike is "," and ";". A particularly difficult look-alike cluster is formed by the number "1", the lower-case letter "l", the upper-case letter "I", and the exclamation point "!". The template for each member of a cluster of look-alike anti-characters must distinguish itself against the templates of other members of the same cluster.

A comparison matrix for design font versions of lower-case symbol classes a–z is shown in FIG. 1B, specifically illustrating the version/image comparisons of the cluster of look-alike characters "o", "c", and "e". The input version fonts (including "$o_1$", "$o_2$", "$o_3$", "$c_1$", "$c_2$", "$c_3$", "$e_1$", "$e_2$", and "$e_3$" lower-case) extend in alpha-numeric order along the horizontal axis of the FIG. 1B comparison matrix. The unenhanced template images (also including "o", "c", and "e" lower-case) extend along the vertical axis. The initial set of L comparisons of the input version "$o_2$" with each of the unenhanced templates is shown in FIG. 1B extending vertically in a column above the "$o_2$" input version. Only the lower-case templates have been shown in FIG. 1B to conserve space. The upper-case and numbers and punctuation are have been omitted.

The column of L initial comparisons for the input version "$o_2$" (lower-case) is displayed in a horizontal format in the unenhanced template bar graph of FIG. 3A. The initial unenhanced template images extend in alphanumeric order along the x axis of the bar graph. The value of the version/image comparisons (between 0 and 1.00) are plotted against the y axis. The "$o_2$" bar graph of FIG. 3A is based on the lower-case comparison matrix of FIG. 1B; more particularly on the "$o_2$" comparisons in the vertical column extending upwards from the "$o_2$" position along the horizontal axis. Each version within the symbol classes has a distinct unenhanced template bar graph containing L version/image comparisons similar to the "$o_2$" bar graph of FIG. 3A. That is, the "o" symbol class has an "$o_1$" bar graph, an "$o_2$" bar graph, and an "$o_3$" bar graph. The unenhanced template bar graph of initial comparisons for the input version "$c_2$" is shown FIG. 4A and the unenhanced template bar graph for "$e_2$" is shown in FIG. 5A.

During the primary comparison step, a total of V primary comparisons C* are identified. The highest comparison C* for the input version "$o_2$" (lower-case) is of course the unenhanced template "o" (lower-case). The $o_2$/o comparison (bold) has a value of 1.00 because in the embodiment of FIG. 3A the unenhanced template image "o" is identical to the "$o_2$" version of the symbol class "o". In general however, the $o_1$/o comparison and $o_2$/o comparison and $o_3$/o comparison will have values very close to 1.00 (but not equal to 1.00) because in general the image "o" will not be identical to any of the "o" input versions. The C* for input version "$c_2$" is the unenhanced template "c" at a value of 1.00 (see FIG. 4A—bold) and the C* for the input version "$e_2$" is the unenhanced template "e" (see FIG. 5A—bold).

During the secondary comparison step, a total of V secondary comparisons C** are identified, forming V pairs of identified comparisons C* and C, one pair from each of the V sets of comparisons. The next highest comparison C for the input version "$o_2$" in FIG. 3A is the $o_2$/c comparison (bold) for the unenhanced template "c" (lower-case) which is more like the version "$o_2$" than any of the other L-1 images in the alphanumeric library. The $o_2$/c comparison (bold) has a value of only 0.88 because the unenhanced template "c" is not identical to the input version "$o_2$". The $o_2$/e comparison of FIG. 3A is slightly less at 0.84. In the case of input version "$c_2$" (see FIG. 4A), C is the comparison $c_2$/o (bold) at a value of 0.88. In the case of the input version "$e_2$" (see FIG. 5A), C is the comparison $e_2$/c (bold) at 0.86.

The size of the recognition margin M determined in the each iteration is the difference between the value of C* and the value of C**. The initial $o_2$/c margin is 0.12 (see FIG. 3A), and the initial $c_2$/o margin is also 0.12 (see FIG. 4A). The initial $e_2$/c margin is 0.14 (see FIG. 5A).

GENERAL CASE of dM/dT* and dM/dT**

The general case of template enhancement with respect to a particular input version $s_i$ involves maximizing the minimum recognition margin between the primary comparison C* and the maximum secondary comparison C** which form the selected pair of identified comparisons C* and C**, in the general relationship:

maximize $M=\min[C^*-\max(C^{**})]$ where

M is the recognition margin between C* and C**,

C* is the primary comparison for the template T* which is the closest template in the library to the input version $s_i$, and C is the secondary comparison for the template T which is the second closest template in the library to the input version $s_i$.

Multi-variable functions such as the recognition margin M may be maximized by a number of general numerical optimization processes. The process employed in the embodiment of FIGS. 3, 4, and 5, is the "gradient ascent" or "steepest ascent" technique; and is related to the steepest descent technique employed in minimization problems. In order for the recognition margin M to increase, C** must be reduced by the weighting, or C* must be increased, or both. The incremental weighting effect within template T evolves pixel aberrations in the bit map thereof which reduces C. That is, after multiple iterations of weighting, T looks less and less like the input version $s_i$, causing comparison C to have a lower value.

Figure 3B:
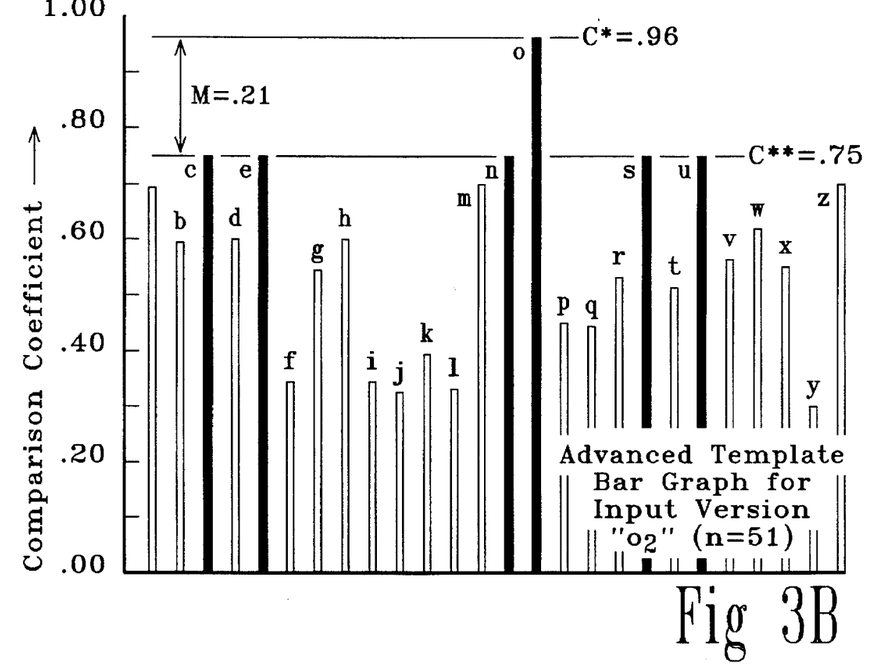
FIG. 3B is a bar graph of the set of advanced template comparison coefficients between the lower-case input version "$o_2$" and the lower-case letters a–z.
Figure 4B:
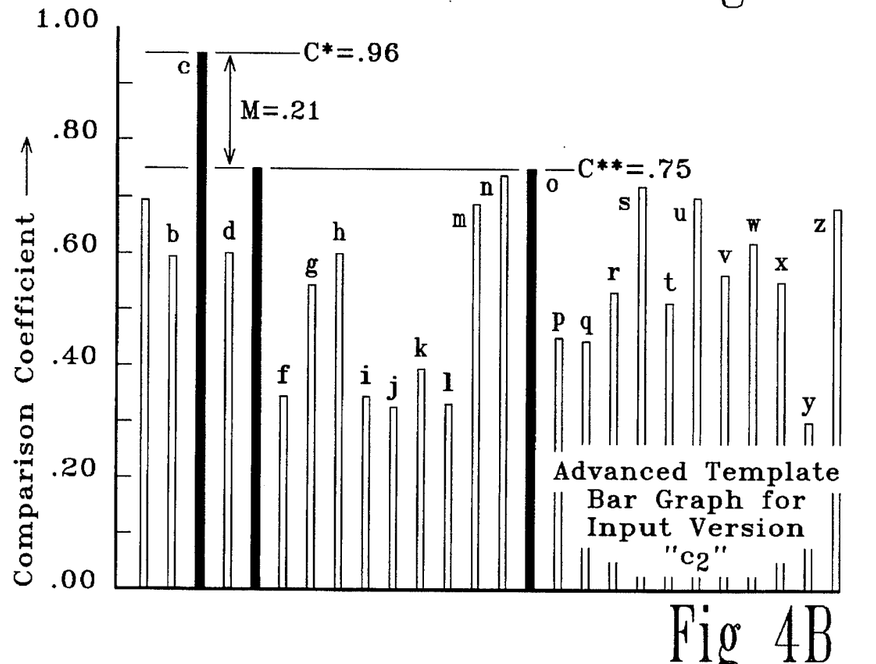
Figure 5B:
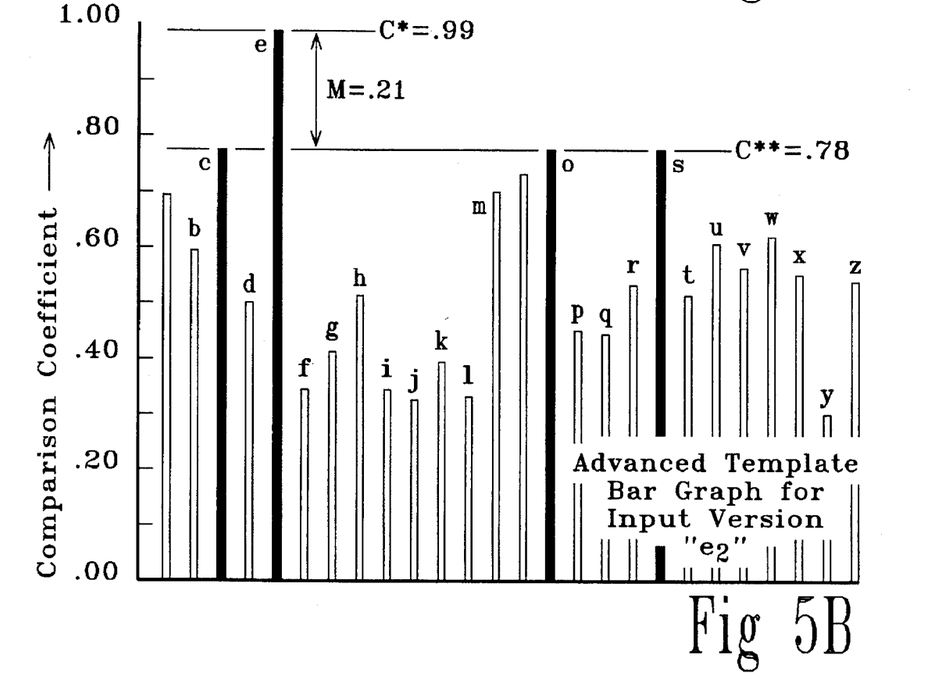

The resulting increase in the $o_2$/c margin is displayed in advanced template bar graph of FIG. 3B (shown immediately under the initial unenhanced template bar graph of FIG. 3A). The "$o_2$" template bar graph shows an advanced set of L comparisons for the input version "$o_2$" (lower-case) relative to the templates (lower-case). The advanced template bar graph of FIG. 3B has the same format as the initial image bar graph of FIG. 3A. The enhanced templates extend in alpha-numeric order along the x axis of the bar graph. The value of the comparison is plotted against the y axis. The $o_2$/c margin has increased from 0.12 as shown in the initial image bar graph of FIG. 3A, to 0.21 as shown in the advanced template bar graph of FIG. 3B. Each of the V input versions has a distinct template bar graph containing L comparisons similar to the "$o_2$" set of FIG. 3B, which evolves from the initial image bar graph. The template column bar graph of advanced comparisons for the input version "$c_2$" is shown FIG. 4B, and the template bar graph for "$e_2$" is shown in FIG. 5B The incremental weighting effect also accumulates pixel aberrations in the bit map of template T* and may cause a slight reduction in C*. That is, after multiple iterations of weighting, T* looks less and less like the input version $s_i$. However, because M is maximized, each iteration, C* is maintained at a level near 1.00. The resulting decrease in the $o_2$/o comparison may be seen in advanced template bar graph of FIG. 3B. The $o_2$/o comparison has been reduced from 1.00 in FIG. 3A to 0.96 in FIG. 3B. The $c_2$/c comparison has also been reduced to 0.96 (see FIG. 4B), and the $e_2$/e comparison has become 0.98 (see FIG. 5B).

In the case of the version/image comparison $o_2$/c (see FIG. 3B), the $o_2$/c margin increases and approaches the $o_2$/e margin of 0.21. When the $o_2$/c margin is greater than the $o_2$/e margin, the C of the $o_2$/e comparison replace the C of the $o_2$/c comparison. As the iterations proceed, template T** alternates between template "c" and template "e" until both the $o_2$/c margin and the $o_2$/e margin drop below the margin for yet another unenhanced template such as "n" or "s". As the recognition margin increase, the cluster of "o" anti-characters expands to include "c", "e", "n", "s", and "u" as shown in FIG. 3B Further enhancement of the "o" template would increase the margin slightly to include "m" and "z". FIG. 4B shows a cluster of anti-characters accumulating near the 0.75 comparison value for symbol class "c"; and FIG. 5B shows the cluster "c", "o", and "s" at 0.77.

The maximum margin M is established by incrementally weighting template T* and template T** during the comparing-iteration cycles. The incremental templates weights W* and W** are determined through the first derivative (vector gradient) of the recognition margin relative to the multi vector components of templates T* and T**:

$M=C^*-C^{**}$

The above recognition margin M and primary comparison C* and secondary comparison C** are all scalars. The vector gradient of these scalars M and C* and C** with respect to any vector is the first derivative thereof with respect to the vector. The first derivative (vector gradient) of M and C* and C** with respect to the closest enhanced pixel template T* and the next closest enhanced pixel template T** are:

$dM/dT^*=dC^*/dT^*-dC^{**}/dT^*$ and $dM/dT^{**}=dC^*/dT^{}-dC^{}/dT^{**}$

The step weight increments which are added to T* and to T** each iteration are:

$$W^* = u^*(dM/dT^*)$$

and $$W^{} = u^{}(dM/dT^{**})$$

where u, is the weighting factor mu in $dM/dT^*$ for each comparing iteration and $u^{}$ is the weighting factor mu in $dM/dT^{}$ for each comparing iteration The weighting factors u, and $u^{**}$ may be the same or different depending on the enhancement application. In general, a larger mu will support a larger change in M each iteration resulting in a higher rate of evolution. However, large changes may cause tunnelling under the target maxima in the M function, and initiate unstable oscillations in the iteration process. Small mus are slower and more stable. A modest mu may be employed to approach a maxima, and reduced to a smaller mu to more precisely locate the maxima.

Each iteration "n" of the enhancement process produces a new template $T_{n+1}$ which is slightly different from the old template $T_n$ as shown below:

$$T^*_{n+1} = T^*_n + W^* = T^*_n + u^*(dM/dT^*)$$
$$= T^*_n + u^*(dC^*/dT^* - dC^{**}/dT^*)$$

$$T^{}_{n+1} = T^{}_n + W^{} = T^{}_n + u^{}(dM/dT^{})$$
$$= T^{}_n + u^{}(dC^*/dT^{} - dC^{}/dT^{**})$$

With each iteration, $T^{}$ and $C^{}$ drift further from $T^*$ and $C^*$, and the recognition margin M becomes larger. The separation continues until a new pair of identified primary and secondary comparisons $C^*$ and $C^{**}$ (with new templates $T^*$ and $T^{**}$) replace the present ones.

EVOLUTION OF "o" ANTI-CHARACTERS "censu"

The evolution of the library of templates in response to the symbol class "o" and the expanded anti-character cluster "c", "e", "n", "s", and "u" is shown below. This iteration by iteration sequence is based on the bar graph data of FIGS. 3A and 3B, and the initial condition that the initial Template "o" is identical to the "$o_2$" version of the symbol class "o", with a single weighting factor of $u^* = u^{**} = 0.01$.

At n=0 (before any iterations)

Template $o_0$=Input Version $o_2$

At n=10 (after 10 iterations)

Template $o_{10}$=(Tem $o_0$)–0.10(Tem c)

The Tem c coefficient is the product (n)(u)=(10)(0.01)=10. For the first ten iterations 1–10, the template for $C^{**}$ is only Tem c, and the increase in M per iteration is rapid.
At n=16

Template $o_{16}$=(Tem $o_0$)–0.13(Tem c)–0.03(Tem e)

During the six iterations 11–16, the template for $C^{**}$ alternates between Tem c and Tem e.

Each coefficient increases by 3×0.01, and the increase in M per iteration is less rapid.
At n=28

Template $o_{28}$=(Tem $o_0$)–0.17 (Tem c)–0.07 (Tem e)–0.04(Tem n)

During the 12 iterations 17–28, the template for $C^{**}$ alternates between Tem c, Tem e and Tem n. Each coefficient increases by 4×0.01.
At n=36

Template $o_{36}$=(Tem $o_0$)–0.19(Tem c)–0.09(Tem e)–0.06(Tem n)–0.02(Tem s)

During the 8 iterations 29–36, the template for $C^{**}$ alternates between Tem c, Tem e, Tem n and Tem s. Each coefficient increases by 2×01.
At n=51

Template $o_{51}$=(Tem $o_0$)–22(Tem c)–0.12(Tem e) –0.09(Tem n)–0.05(Tem s)–03(Tem u)

During the 15 iterations 37–51, the template for $C^{**}$ alternates between Tem c Tem e Tem n Tem s and Tem u. Each coefficient increases by 3×0.01, and the increase in M per iteration is very slow.

Each input version and associated cluster has a similar sequence in which the comparisons for the anti-characters evolve toward a common comparison value and recognition margin. As the iterative process continues, the number of anti-characters increases slowing down the rate of evolution. The process may be terminated when the minimal improvement in enhancement for the next iteration does not merit the computer effort required.

COMPARISON FUNCTION—CAUCHY—SHWARTZ

The comparison function between any input version $s_i$ and the library templates ($T_1\ T_2\ T_3 \ldots T_j \ldots T_G$) involves a pixel by pixel treatment and summation of the $s_i$ bit map with each of the template bit maps. The pixel by pixel treatment provides the set of numerical comparison coefficients ($C_{i1}\ C_{i2}\ C_{i3} \ldots T_{ij} \ldots C_{iL}$) for the input version $s_i$. The V×L comparisons are numerical coefficients of comparison, the value of which indicates the degree of pixel similarity between the version $s_i$ and the template under comparison. Preferably, a coefficient having a high value indicates a close comparison between $s_i$ and the template, and a coefficient having a low value indicates a remote comparison between $s_i$ and the template. Preferably, the pixel data in the template bit maps are centered within the bit map and rotationally aligned. The bit maps may be X/Y scaled to the same number of pixel rows and pixel columns which provides corresponding pixel locations in each bit map.

Any suitable comparison function may be employed such as the Cauchy-Shwartz function which is the version-template dot product (the summation of the product of corresponding pixels) divided by the version norm $\|s_i\|$ and the template norm $\|T_j\|$:

Cauchy-Shwartz Function=$(S_i)\cdot(T_j)/(\|s_i\|)(\|T_j\|)$.

The vector of each pixel contained in the input version bit map is multiplied by the vector of the corresponding pixel contained in the template bit map, and divided by the two norms. The norm is a normalization factor formed by the square root of the sum of the squares of each pixel value in the bit map. The Cauchy-Shwartz comparison for each version/template provides a comparison coefficient having a value of between 0 and 1.00 as shown along the vertical axis of FIGS. 3, 4, and 5. The above expression of the Cauchy Shwartz function may be simplified by pre-normalizing the $s_i$ term to provide:

Cauchy-Shwartz Function=$(s_i) \cdot (T_i)/(\|T_i\|)$.

The $s_i$ term in the new simplified expression now represents the more complex earlier term $(s_i)/(\|s_i\|)$. In terms of the simplified Cauchy Shwartz function, the enhancement process becomes:

for the primary comparison $$c^* = (s_i) \cdot (T^*)/(\|T^*\|),$$

and for the secondary comparison $$c^{} = (s_i) \cdot (T^{})/(\|T^{**}\|).$$

Mathematically, the template enhancement process involves finding a set of vector templates $(T_1 \, T_2 \, T_3 \ldots T_i \ldots T_G)$ which maximizes (over all of the templates) the minimum recognition margin between the primary comparison $C^*$ and the maximum secondary comparison $C^{**}$:

maximize $M$=Min $C^*$-Max $C^{**}$ maximize $M$=Min $[(s_i) \cdot (T^*)/(\|T^*\|)$—Max $\{(s_i) \cdot (T^{})/(\|T^{}\|)\}]$ The derivatives for the Cauchy-Shwartz comparison function become:

$dM/dT^*$ = $dC^*/dT^* - dC^{**}/dT^*$
= $s_i/\|T^*\| - (s_i \cdot T^*)T^*/(\|T^*\|)^3$ and $dM/dT^{**}$ = $dC^*/dT^{} - dC^{}/dT^{**}$
= $s_i/\|T^{}\| - (s_i \cdot T^{})T^{}/(\|T^{}\|)^3$.

Figure 6A:
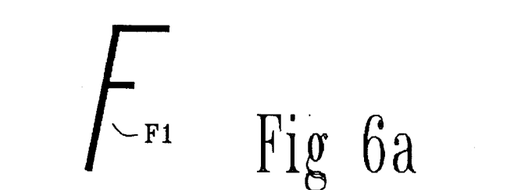
FIGS. 6a, 6b, and 6c shows six pixel versions forming three sub-classes of the symbol class "F" (uppercase)

SUB-CLASSES—SUB-TEMPLATES (FIGS. 6abc and 7)

The font versions of the symbol classes are not necessarily design fonts employing intentional variations for aesthetic effect. The font versions maybe unintentional variations due to implementation distortions of a single version of a letter. Some makes and models of printers produce darker (or lighter) characters with wider (or thinner) strokes which may be recognized by the OCR process as distinct font versions. Variations in paper quality and toner composition may also contribute to the implementation variations.

Figure 6B:
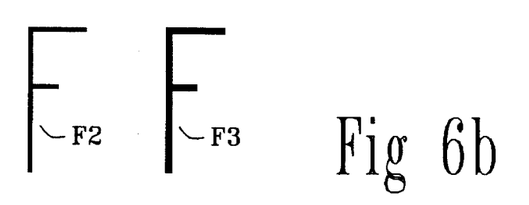
Figure 6C:
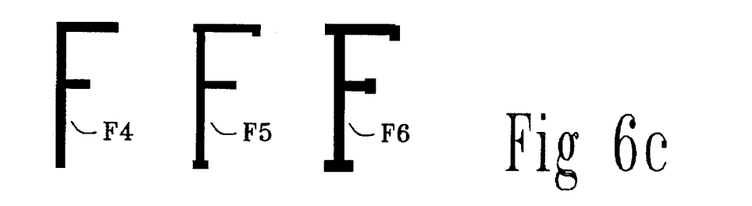

The pixel versions within a given symbol class may therefore be design font variations or implementation variations (or both) of the alpha-numeric symbol corresponding to that symbol class. The slanted pixel version F1 shown in FIG. 6a, is a Duplex Italic design font of the symbol class "F". The simple pixel version F3 shown in FIG. 6b, is a Duplex Roman design font of the symbol class "F". The complex pixel versions F5 and F6 shown in FIG. 6c, are two Triplex Roman fonts of the symbol "F". The simple pixel version F2 shown in FIG. 6b (lefthand version) is an implementation variation (thin) of the F3 pixel version produced by a printer (or toner or paper quality) which inhibits the amount of toner deposited. The simple pixel version F4 shown in FIG. 6C (lefthand version) is an implementation variation (wide) of the symbol "F" produced by a printing environment which promotes toner deposition.

Figure 7:
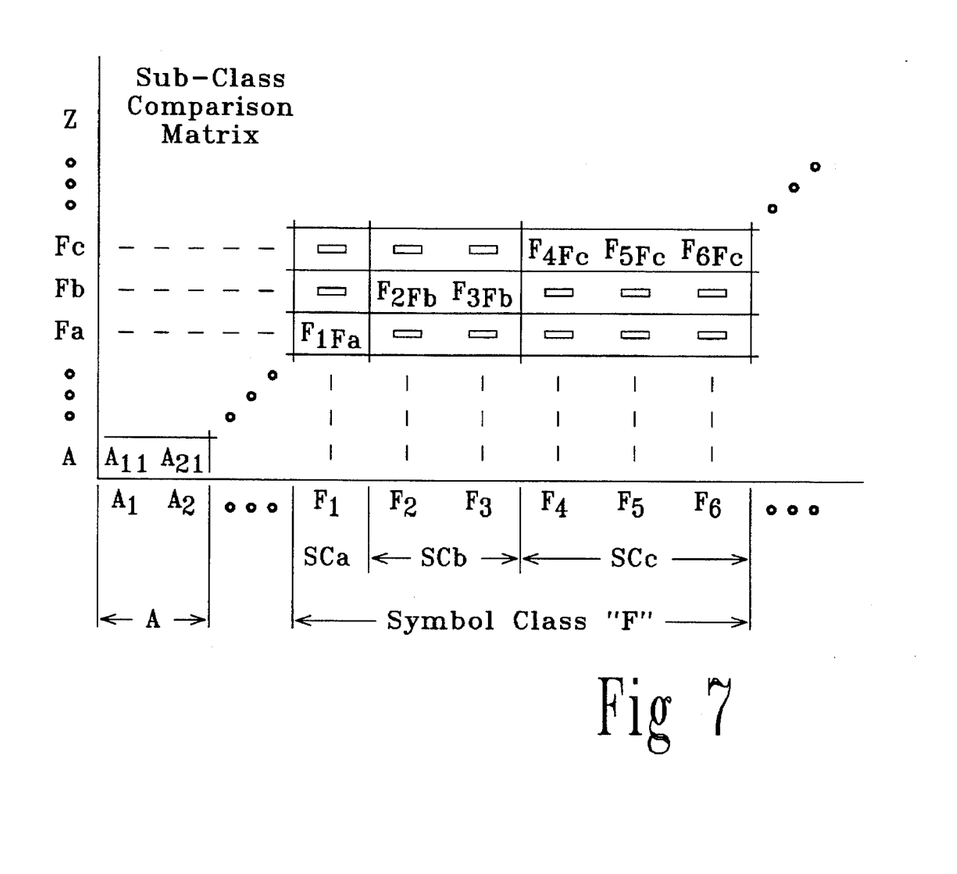
FIG. 7 is a comparison matrix showing the pixel versions and sub-classes of FIG. 6.

The six pixel fonts F1–F6 of the symbol class F are divergent and require three related sub-classes as grouped in FIGS. 6a, 6b, and 6c. Each sub-class is indicated in FIG. 7 as "SCa", "SCb", and "SCc" along the horizontal axis. FIG. 7 is a comparison matrix for design and implementation versions of upper-case symbol classes A–Z with special emphasis on the three related sub-classes of the symbol class F depicted in FIGS. 6a, 6b, and 6c. Each sub-class has a separate sub-template indicated in FIG. 7 as sub-image "Fa", "Fb", and "Fc" along the vertical axis. Slanted pixel font F1 forms a single version sub-class which is recognized as sub-template Fa. Simple font F3 and the thin implementation font F2 form a two version sub-class which is recognized as sub-template Fb. Complex fonts F5 and F6 and wide implementation font F4 form a there version sub-class which is recognized as sub-template Fc.

The sub-image of each of the sub-classes of divergent pixel versions becomes a corresponding sub-template in the library of templates as the enhancement process proceeds. The recognition margins of the divergent pixel versions in a given sub-class are determined slightly differently than in the general embodiment of FIG. 1 which did not have sub-classes. The recognition margins of the pixel versions in related sub-classes are excluded from comparison. This exclusion is permitted in the sub-class embodiment because these pixel versions are all in sub-classes within the same class. During the OCR procedure, it is not critical to distinguish between the six pixel versions F1–F6 of sub-classes Fa, Fb, and Fc because the three sub-classes are all in the class "F". No OCR error results if input version F1 is identified as sub-class Fc rather than subclass Fa.

The inter-sub-class recognition margins may be excluded by not comparing the input version of a given sub-class with the sub-templates of the related sub-classes. This exclusion status is indicated in FIG. 7 by the twelve large dashes in the body of the comparison matrix. The column above each of the input versions F1–F6 has two exclusion dashes, one for each of the related sub-classes. The inter-sub-class exclusion may be effected by embedding a default zero in the comparison matrix at each inter-sub-class position. The resulting recognition margins will be large and out of the competition for the secondary comparison $C^{**}$. Alternatively, the inter-subclass recognition margins may be excluded by not determining a recognition margin between the pixel versions and the sub-templates of the related sub-classes.

CONCLUSION

It will be apparent to those skilled in the art that the objects of this invention have been achieved as described hereinbefore. Clearly various changes may be made in the structure and embodiments shown herein without departing from the concept of the invention. Further, features of the embodiments shown in the various FIGS. may be employed with the embodiments of the other FIGS. Therefore, the scope of the invention is to be determined by the terminology of the following claims and the legal equivalents thereof.

I claim as my invention:

1. The method of matching a pixel version of an unknown input symbol with a library of enhanced pixel templates by recognition enhancement of a library of L unenhanced pixel images ($I_1 I_2 I_3 \ldots I_j \ldots I_L$) with respect to a pre-existing group of G classes of symbols ($S_1 S_2 S_3 \ldots S_i \ldots S_G$) at least some of which include multiple pixel versions of the same symbol, for providing a library of G recognition enhanced pixel templates ($T_1 T_2 T_3 \ldots T_i \ldots T_G$) one enhanced template corresponding to each of the symbol classes, comprising the steps of:

provideing a library of L unenhanced pixel images ($I_1 I_2 I_3 \ldots I_j \ldots I_L$) to be enhanced to provide a library of G recognition enhanced pixel templates ($T_1 T_2 T_3 \ldots T_i \ldots T_G$);

providing a pre-existing group of G symbol classes ($S_1 S_2 S_3 \ldots S_i \ldots S_G$) with the multiple pixel versions therein, a total of V pixel versions;

comparing each of the V pixel versions with each of the L pixel images to obtain V×L comparisons forming V sets of L comparisons ($C_1 C_2 C_3 \ldots C_j \ldots C_L$), one set of L comparisons for each of the V pixel versions, each set of comparisons having a comparison $C_i$ for each pixel image $I_j$;

identifying a primary comparison C* from the L comparisons within each of the V sets of comparisons having the closest comparison with the pixel version for that set of comparisons forming a collection of V primary comparisons C* ($C_1^* C_2^* C_3^* \ldots C_i^* \ldots C_v^*$);

identifying a secondary comparison C from the L-1 remaining comparisons within each of the V sets of comparisons having the next closest comparison with the pixel version for that set of comparisons forming a collection of V secondary comparisons C ($C_1^{} C_2^{} C_3^{} \ldots C_i^{} C_v^{**}$), to provide V pairs of identified comparisons C* and C**, one pair from each of the V sets of comparisons;

determining V recognition margins ($M_1 M_2 M_3 \ldots M_i \ldots M_V$), one recognition margin between each pair of identified comparisons C* and C**;

selecting the single pair of identified comparisons C* and C** having the smallest recognition margin M* of all of the V pairs of identified comparisons from the V sets of comparisons;

identifying a single symbol within a class S* corresponding to the selected single comparison C*, and determining if the class S* has multiple pixel versions, and excluding the multiple pixel versions, if any, in the class S* from the remaining steps leaving the identified single symbol;

identifying the single pair of pixel images I* and I** corresponding to the selected single pair of identified comparisons C* and C**;

weighting certain pixels of the closest pixel image I* and the next closest pixel image I** corresponding to the selected single pair of identified comparisons C* and C** in order to incrementally increase the recognition margin M* therebetween causing the pixel image I* to become the closest enhanced pixel template T* and the pixel image I to become the next closest enhanced pixel template T;

iterating the comparing, identifying, determining, selecting, and weighting steps until the library of pixel images has become the library of G recognition enhanced symbol templates ($T_1 T_2 T_3 \ldots T_i \ldots T_G$) which have been recognition enhanced with respect to the pre-existing group of G pixel symbols ($S_1 S_2 S_3 \ldots S_i \ldots S_G$), at least some templates of which have weighted pixel aberrations not present in the pixel version within each of the pre-existing group of G corresponding symbol classes; and matching a pixel version of an unknown input symbol of the group of G symbol classes ($S_1 S_2 S_3 \ldots S_i \ldots S_G$) with the library of enhanced templates ($T_1 T_2 T_3 \ldots T_i \ldots T_G$) by comparing the pixel version with each of the enhanced pixel templates in the library of enhanced templates and selecting the enhanced template with the closest comparison.

2. The method of claim 1, wherein the recognition enhancement of the unenhanced pixel images is terminated when the smallest recognition margin is greater than a predetermined minimum value.

3. The method of claim 1, wherein the recognition enhancement of the unenhanced pixel images is terminated when the incremental increase in the smallest recognition margin each iteration is smaller than a predetermined minimum increase.

4. The method of claim 1, wherein the recognition enhancement of the unenhanced pixel images is terminated when a specified number of weighting iterations have been executed.

5. The method of claim 1, wherein the recognition enhancement of the unenhanced pixel images is terminated when a preassigned period of iteration processing time has expired.

6. The method of claim 1, wherein the recognition enhancement of the unenhanced pixel images is terminated when the individual templates in clusters of similarly shaped templates have progressed to the same recognition margin and have become mutual anti-characters.

7. The method of claim 6 wherein the pixel versions within a given symbol class are font variations of the alpha-numeric symbol corresponding to that symbol class.

8. The method of claim 6 wherein the pixel versions within a given symbol class are implementation variations of the alpha-numeric symbol corresponding to that symbol class.

9. The method of claim 6 wherein the pixel versions within a given symbol class are font variations and implementation variations of the alpha-numeric symbol corresponding to that symbol class.

10. The method of claim 6 wherein the pixel versions within a given symbol class are variations of the alpha-numeric symbol corresponding to that symbol class, and divergent pixel versions in at least some of the symbol classes form related sub-classes of pixel versions within that symbol class.

11. The method of claim 10 wherein each of the sub-classes of divergent pixel versions has a corresponding sub-image which becomes a corresponding sub-template in the library of templates.

12. The method of claim 11 wherein during the determination of the recognition margins of a divergent pixel version in a given sub-class, the recognition margins with of the sub-templates of related sub-classes are excluded.

13. The method of claim 12 wherein the inter-subclass recognition margins are excluded by not determining a recognition margin with the sub-templates of the related sub-classes.

14. The method of claim 12 wherein the inter-subclass recognition margins are excluded by not comparing the given sub-class with the sub-templates of the related sub-classes.

15. The method of claim 1, wherein the V×L comparisons are numerical coefficients of comparison, the value of which indicates the degree of pixel similarity between the pixel version within a symbol class $S_i$ and the pixel image $I_j$ under comparison Cij.

16. The method of claim 15, wherein a coefficient having a high value indicates a close comparison between the input pixel version $s_i$ and the pixel image under comparison $I_j$, and a coefficient having a low value indicates a remote comparison between the input pixel version $s_i$ and the pixel image under comparison $I_j$.

17. The method of claim 15, wherein the recognition margin is the difference between the comparisons C* and C** of each selected pair of comparisons.

18. The method of claim 17, wherein the recognition enhancement of a particular pixel image $I_j$ with respect to a particular pixel version $s_i$ involves maximizing the minimum recognition margin between the primary comparison C* and the maximum secondary comparison C** which form the selected pair of identified comparisons C* and C** for the pixel version $s_i$, in the general relationship:

$$\text{maximize } M = \min[C^* - \max(C^{**})]$$

where

M is the recognition margin between C* and C**,

C* is the primary comparison for the template T* which is the closest template in the library to the particular pixel version $s_i$, and C is the secondary comparison for the template T which is the second closest template in the library to the pixel version $s_i$.

19. The method of claim 18, wherein only the closest pixel image I* is weighted causing the closest pixel image I* to become the closest pixel template T*.

20. The method of claim 19, wherein the weighting added to the closest template T* each iteration is determined by the first derivative of the recognition margin M* relative to the template T*:

$$W^* = u^*(dM/dT^*) = u^*(dC^*/dT^* - dC^{**}/dT^*)$$

where

W* is the weighting added each iteration, and u* is a weighting factor mu* for dM/dT*.

21. The method of claim 20, wherein each iteration of the enhancement process produces a new T* template which is slightly different from the old T* template:

$$\begin{aligned} T^*_{n+1} = T^*_n + W^* &= T^*_n + u^*(dM/dT^*) \\ &= T^*_n + u^*(dC^*/dT^* - dC^{**}/dT^*) \end{aligned}$$

where n is the number of the iteration, $T^*_{n+1}$ is the new T* template, and $T^*_n$ is the old T* template.

22. The method of claim 18, wherein only the next closest pixel image I is weighted causing the next closest pixel image I to become the next closest pixel template T**.

23. The method of claim 22, wherein the weighting added to the next closest template T each iteration is determined by the first derivative of the recognition margin M relative to the template T**:

$$W^{} = u^{}(dM/dT^{}) = u^{}(dC^*/dT^{} - dC^{}/dT^{**})$$

where

W is the weighting added each iteration, and u is a weighting factor mu for dM/dT.

24. The method of claim 23, wherein each iteration of the enhancement process produces a new T template which is slightly different from the old T template:

$$\begin{aligned} T^{}_{n+1} = T^{}_n + W^{} &= T^{}_n + u^{}(dM/dT^{}) \\ &= T^{}_n + u^{}(dC^*/dT^{} - dC^{}/dT^{**}) \end{aligned}$$

where n is the number of the iteration, $T^*_{n+1}$ is the new T template, and $T^{}_n$ is the old T** template.

25. The method of claim 18, wherein both the closest pixel image I* and the next closest pixel image I** are weighted causing the closest pixel image I* to become the closest pixel template T* and the next closest pixel image I to become the next closest pixel template T.

26. The method of claim 25, wherein the weighting added to T* and to template T** each iteration are determined by the first derivative of the recognition margins M* and M** relative to templates T* and T**:

$$W^* = u^*(dM/dT^*) = u^*(dC^*/dT^* - dC^{**}/dT^*)$$

$$W^{} = u^{}(dM/dT^{}) = u^{}(dC^*/dT^{} - dC^{}/dT^{**})$$

where

W* is the weighting added to T* each iteration, u* is a weighting factor mu, for dM/dT*, W is the weighting added to T each iteration, and u is a weighting factor mu for dM/dT**.

27. The method of claim 26, wherein the weighting factor u* is equal to the weighting factor u**.

28. The method of claim 26, wherein each iteration produces a new T* and T** templates which are slightly different from the old T* and T** templates:

$$T^*_{n+1} = T^*_n + W^* = T^*_n + u_*(dC^*/dT^* - dC^{**}/dT^*)$$

$$T^{}_{n+1} = T^{}_n + W^{} = T^{}_n + u^{**}(dC^*/dT^{} - dC^{}/dT^{**})$$

where n is the number of the iteration, $T^*_{n+1}$ is the new T* template, $T^*_n$ is the old T* template, $T^{}_{n+1}$ is the new T template, and $T^{}_n$ is the old T template.

29. The method of claim 15, wherein the value of each numerical coefficient of comparison $C_j$ is based on a pixel by pixel comparison between each pixel of pixel version $s_i$ and each pixel of pixel image $I_j$ under comparison.

30. The method of claim 29, wherein the pixel by pixel comparison is the dot product between each pixel of pixel version $s_i$ and each pixel of pixel image $I_j$ under comparison.

31. The method of claim 29, wherein the pixel by pixel comparison is based on the Cauchy-Shwartz Function:

$$\text{Cauchy-Shwartz Function} = (s_i) \cdot (T_i) / (\|s_i\|)(\|T_i\|).$$

where $(s_i)$ is the input version under comparison, $(T_i)$ is the enhanced template under comparison, $(\|s_i\|)$ is the version norm, and $(\|T_i\|)$ is the template norm.

* * * * *